(12) United States Patent
Yang et al.

(10) Patent No.: US 10,409,441 B2
(45) Date of Patent: Sep. 10, 2019

(54) METHOD OF PROCESSING APPLICATION CPU USAGE RATE ANOMALY, AND DEVICE AND MOBILE TERMINAL

(71) Applicant: BEIJING KINGSOFT INTERNET SECURITY SOFTWARE CO., LTD., Beijing (CN)

(72) Inventors: Haiying Yang, Beijing (CN); Shanglun Ding, Beijing (CN); Chao Xiao, Beijing (CN); Kangzong Zhang, Beijing (CN)

(73) Assignee: BEIJING KINGSOFT INTERNET SECURITY SOFTWARE CO., LTD., Beijing (CN)

( * ) Notice: Subject to any disclaimer, the term of this patent is extended or adjusted under 35 U.S.C. 154(b) by 204 days.

(21) Appl. No.: 15/322,990

(22) PCT Filed: Jun. 23, 2015

(86) PCT No.: PCT/CN2015/082114
§ 371 (c)(1),
(2) Date: Dec. 29, 2016

(87) PCT Pub. No.: WO2016/000544
PCT Pub. Date: Jan. 7, 2016

(65) Prior Publication Data
US 2017/0192619 A1   Jul. 6, 2017

(30) Foreign Application Priority Data

Jun. 30, 2014  (CN) .......................... 2014 1 0309657

(51) Int. Cl.
*G06F 3/0481* (2013.01)
*G06F 3/0484* (2013.01)
(Continued)

(52) U.S. Cl.
CPC .......... *G06F 3/0481* (2013.01); *G06F 3/0484* (2013.01); *G06F 9/485* (2013.01);
(Continued)

(58) Field of Classification Search
CPC ..................................................... G06F 3/0481
(Continued)

(56) References Cited

U.S. PATENT DOCUMENTS 8,036,234 B2 * 10/2011 Belling ............... H04M 7/0039
370/401
9,628,356 B2 * 4/2017 Gintis ................... H04L 43/045
(Continued)

FOREIGN PATENT DOCUMENTS

CN   102306118 A   1/2012
CN   102810059 A   12/2012
(Continued)

OTHER PUBLICATIONS

Pathak, Abhinav What is keeping my phone awake? Characterizing and Detecting No-Sleep Energy Bugs in Smartphone Apps, Jun. 2012, MobiSys '12 Jun. 25-29, 2012, pp. 267-280 (Year: 2012).*
(Continued)

*Primary Examiner* — William D Titcomb
(74) *Attorney, Agent, or Firm* — David D. Brush; Westman, Champlin & Koehler, P.A.

(57) ABSTRACT

Provided are a method and a device for processing abnormal CPU utilization of an application, and a mobile terminal. The method includes determining that CPU utilization of the application is abnormal; and displaying a prompt message of killing a process, such that a user checks and kills the process according to the prompt message.

16 Claims, 3 Drawing Sheets

(51) Int. Cl.
*G06F 11/30* (2006.01)
*G06F 11/32* (2006.01)
*G06F 11/34* (2006.01)
*G06F 9/48* (2006.01)
*G06F 11/07* (2006.01)
*G06F 3/0482* (2013.01)
*G06F 8/61* (2018.01)

(52) U.S. Cl.
CPC ...... *G06F 11/0703* (2013.01); *G06F 11/0793* (2013.01); *G06F 11/3013* (2013.01); *G06F 11/3024* (2013.01); *G06F 11/328* (2013.01); *G06F 11/3495* (2013.01); *G06F 3/0482* (2013.01); *G06F 8/61* (2013.01); *G06F 8/62* (2013.01); *G06F 11/3409* (2013.01); *G06F 2201/865* (2013.01); *G06F 2209/501* (2013.01); *G06F 2209/508* (2013.01)

(58) Field of Classification Search
USPC .......................................................... 715/709
See application file for complete search history.

(56) References Cited

U.S. PATENT DOCUMENTS

| | | | | |
|---|---|---|---|---|
| 9,970,966 | B2* | 5/2018 | Chen | G06F 11/3062 |
| 2006/0190773 | A1* | 8/2006 | Rao | G06F 8/65 |
| | | | | 714/38.14 |
| 2010/0058457 | A1* | 3/2010 | Ormazabal | H04L 43/0852 |
| | | | | 726/11 |
| 2011/0307879 | A1* | 12/2011 | Ishida | G06F 8/658 |
| | | | | 717/170 |
| 2012/0137369 | A1* | 5/2012 | Shin | G06F 21/57 |
| | | | | 726/25 |
| 2013/0110761 | A1* | 5/2013 | Viswanathan | G06N 20/00 |
| | | | | 706/52 |
| 2014/0173319 | A1 | 6/2014 | Zeng | |
| 2014/0313882 | A1* | 10/2014 | Rucker | H04W 4/70 |
| | | | | 370/219 |
| 2015/0058867 | A1 | 2/2015 | Zhou | |
| 2015/0233985 | A1* | 8/2015 | Chen | G01R 21/133 |
| | | | | 702/60 |

FOREIGN PATENT DOCUMENTS

| | | |
|---|---|---|
| CN | 102946486 A | 2/2013 |
| CN | 103595758 A | 2/2014 |
| KR | 20060128231 A | 12/2006 |

OTHER PUBLICATIONS

English translation of Office Action from SIPO, dated Feb. 7, 2018 for CN application 201410309657.6.
International Search Report dated Sep. 8, 2015 for corresponding International Application No. PCT/CN2015/082114, filed Jun. 23, 2015.
Written Opinion of the International Searching Authority dated Sep. 8, 2015 for corresponding International Application No. PCT/CN2015/082114, filed Jun. 23, 2015.
English translation of the Written Opinion of the International Searching Authority dated Nov. 3, 2016 for corresponding International Application No. PCT/CN2015/082114, filed Jun. 23, 2015.

* cited by examiner

METHOD OF PROCESSING APPLICATION CPU USAGE RATE ANOMALY, AND DEVICE AND MOBILE TERMINAL

CROSS-REFERENCE TO RELATED APPLICATIONS

This application is a US national phase application of an International Application No. PCT/CN2015/082114, filed on Jun. 23, 2015, published as WO 2016/000544 A1. which claims priority to and benefits of Chinese Patent Application Serial No. 201410309657.6, entitled "Method and device of processing abnormal CPU utilization of application, and mobile terminal", filed with the State Intellectual Property Office of P. R. China on Jun. 30, 2014, the entire contents of which are incorporated herein by reference.

FIELD

The present disclosure relates to a field of mobile communication technology, and more particularly to a method and a device for processing abnormal CPU utilization of an application and a mobile terminal.

BACKGROUND

With the development of mobile communication technology, functionality of mobile terminal (e.g. smartphone) has become increasingly powerful. Applications (APPs) with various functions are generally installed in a smartphone, and each application consumes certain resources of a central processing unit (CPU) when running.

At present, a user may obtain the present CPU utilization of a smartphone through an application such as Tencent Manager, 360 Master etc. installed on the smartphone, in which the CPU utilization represents consumption of CPU resources in a smartphone system. Generally, the lower the CPU utilization, the higher the running efficiency of the smartphone system. However, in the related art, only CPU utilization of each APP is given, but it doesn't judge whether the CPU utilization of each APP is abnormal, such that the user cannot know whether the CPU utilization of each APP running in the present system is abnormal and cannot process the APP with abnormal CPU utilization. The APP with abnormal CPU utilization may influence running efficiency of a smartphone system and further affect the using experience of the smartphone by user.

SUMMARY

Embodiments of the present disclosure seek to solve at least one of the problems existing in the related art to at least some extent. Accordingly, a first objective of the present disclosure is to provide a method for processing abnormal CPU utilization of an application. The method may reduce the influence of the APP with abnormal CPU utilization on the running efficiency of a mobile terminal and improve the running efficiency of the mobile terminal.

A second objective of the present disclosure is to provide a device for processing abnormal CPU utilization of an application.

A third objective of the present disclosure is to provide a mobile terminal.

According to embodiments of a first aspect of the present disclosure, a method for processing abnormal CPU utilization of an application is provided, including: determining that CPU utilization of the application is abnormal; and displaying a prompt message of killing a process, such that a user checks and kills the process according to the prompt message.

Embodiments of a second aspect according to the present disclosure provide a device for processing abnormal CPU utilization of an application. The device includes: a processor, a memory storing an instruction executable by the processor, in which the processor is configured to determine that CPU utilization of the application is abnormal; and display a prompt message of killing a process, such that a user checks and kills the process according to the prompt message.

Embodiments of a third aspect according to the present disclosure provide a mobile terminal. The mobile terminal includes: a shell, a processor, a memory, a circuit board and a power supply circuit, in which the circuit board is located in a space formed by the shell, the processor and the memory are arranged on the circuit board; the power supply circuit is configured to supply power for each circuit or component in the mobile terminal; the memory is configured to store executable program codes; the processor is configured to execute a program corresponding to the executable program codes by reading the executable program codes stored in the memory so as to: determine that CPU utilization of an application is abnormal; and displaying a prompt message of killing a process, such that a user checks and kills the process according to the prompt message.

Additional aspects and advantages of embodiments of present disclosure will be given in part in the following descriptions, become apparent in part from the following descriptions, or be learned from the practice of the embodiments of the present disclosure.

DETAILED DESCRIPTION

Reference will be made in detail to embodiments of the present disclosure, where the same or similar elements and the elements having same or similar functions are denoted by like reference numerals throughout the descriptions. The embodiments described herein with reference to drawings are explanatory, and used to generally understand the present disclosure. The embodiments shall not be construed to limit the present disclosure.

The method and device for processing abnormal CPU utilization of an application and the mobile terminal according to embodiments of the present disclosure will be described with reference to drawings.

Figure 1:
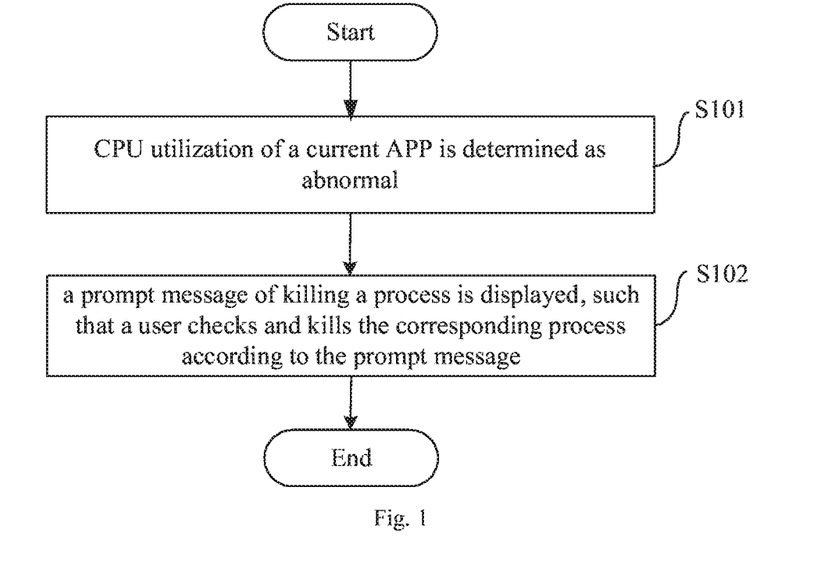
FIG. 1 is a flow chart of a method for processing abnormal CPU utilization of an application according to an embodiment of the present disclosure.

FIG. 1 is a flow chart of a method for processing abnormal CPU utilization of an application according to an embodiment of the present disclosure. As shown in FIG. 1, the method includes the followings.

In act S101, CPU utilization of a current APP is determined as abnormal.

Specifically, the CPU utilization of the current APP may be computed and then it is judged whether the CPU utilization of the current APP is within a preset value range; if the CPU utilization of the current APP is not within the preset value range, the CPU utilization of the current APP may be determined as abnormal.

In this embodiment, before judging whether the CPU utilization of the current APP is within the preset value range, the method also includes: obtaining parameter information of the APP, sending the parameter information to a server, and receiving the preset value range returned from the server after the server inquires a local database according to the parameter information.

Specifically, the mobile terminal receives the preset value range of the CPU utilization of the current APP returned from the server, and judges whether the computed CPU utilization of the current APP is within the preset value range or not, and determines the CPU utilization of the current APP as abnormal if the CPU utilization of the current APP is not within the preset value range.

The preset value range of the CPU utilization of the current APP refers to a value range of the CPU utilization of the current APP pre-stored in a local database according to the parameter information of the current APP. The above parameter information includes but is not limited to identification information, running environment and running scenario of the APP, in which the identification information is configured to uniquely identify an APP and may be a package name or packet signature information of the APP; the running environment refers to hardware environment and software environment of the terminal on which the current APP is installed; the running scenario refers to functions and operations that the APP may complete under a certain running environment (related to hardware environment and software environment), for example, downloading, uploading, running in foreground or in background etc. The more the functions or operations an APP may complete, the higher the CPU utilization of the APP. For example, compared to the running environment of a 2D game, the running environment of a 3D game has a higher CPU utilization, which means that the 3D game consumes more CPU resources.

For example, the APP is a game, the CPU utilization of the game computed by the mobile terminal according to the game's parameter information is 30%, but the value range of the CPU utilization of the game returned from the server is 20%-25%. Thus, the mobile terminal may determine that the CPU utilization of the game is not within the value range of the CPU utilization, and the CPU utilization of the game is abnormal.

In act S102, a prompt message of killing a process is displayed, such that a user checks and kills the corresponding process according to the prompt message.

Specifically, a prompt message of killing a process is displayed after the CPU utilization of the current APP running in the mobile terminal is determined as abnormal. A user may kill the APP with abnormal CPU utilization, i.e., shut down the process of the APP, according to the prompt message. Thus, the influence of the APP with abnormal CPU utilization on the running efficiency of a mobile terminal may be reduced and the running stability of the mobile terminal may be improved.

In this embodiment, after a user checks and kills the corresponding process according to the prompt message, the process may not be killed thoroughly. In order to reduce the influence of the process which is not killed thoroughly on the running efficiency of the mobile terminal, the method shown in FIG. 2 may also include followings.

Figure 2:
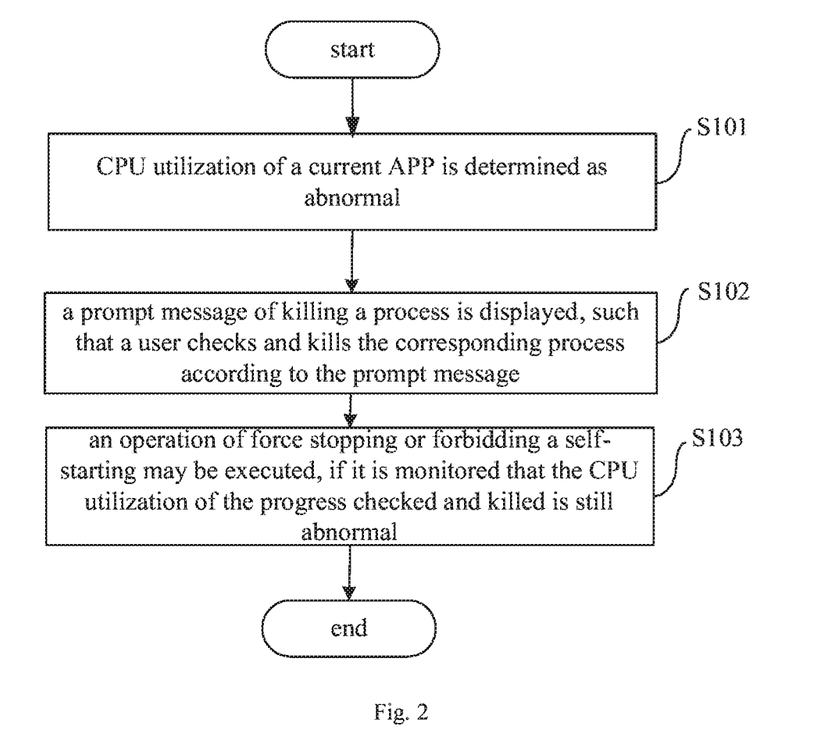
FIG. 2 is a flow chart of a method for processing abnormal CPU utilization of an application according to another embodiment of the present disclosure.

In act S103, an operation of force stopping or forbidding a self-starting may be executed, if it is monitored that the CPU utilization of the progress checked and killed is still abnormal.

Specifically, after a user shuts down the process of the APP with abnormal CPU utilization according to the prompt message, if the APP is configured with a background self-starting function, the APP may automatically start after a preset time interval such as 1 minute, and run in the background process of the mobile terminal continuously. For example, for a smartphone configured with Android system, an APP can use the system broadcast of Android system to trigger the program of the APP to check the running status of the corresponding APP service. If the running status of the corresponding APP service has been shut down, i.e., the corresponding APP has been killed, the running status of the corresponding APP service may be changed and the APP may be restarted in background, i.e., the APP may run in the background process of the mobile terminal again.

If it is monitored that the CPU utilization corresponding to the APP is abnormal, the prompt page including information of force stopping or forbidding a self-starting may be displayed for a user. The mobile terminal may execute an operation of force stopping or forbidding a self-starting on the current APP according to the user's selection. Additionally, the operation of force stopping or forbidding self-starting may be executed automatically according to the specific scenario.

At present, after the operation of force stopping is executed on a certain APP by the user, the APP may still start automatically.

Figure 3:
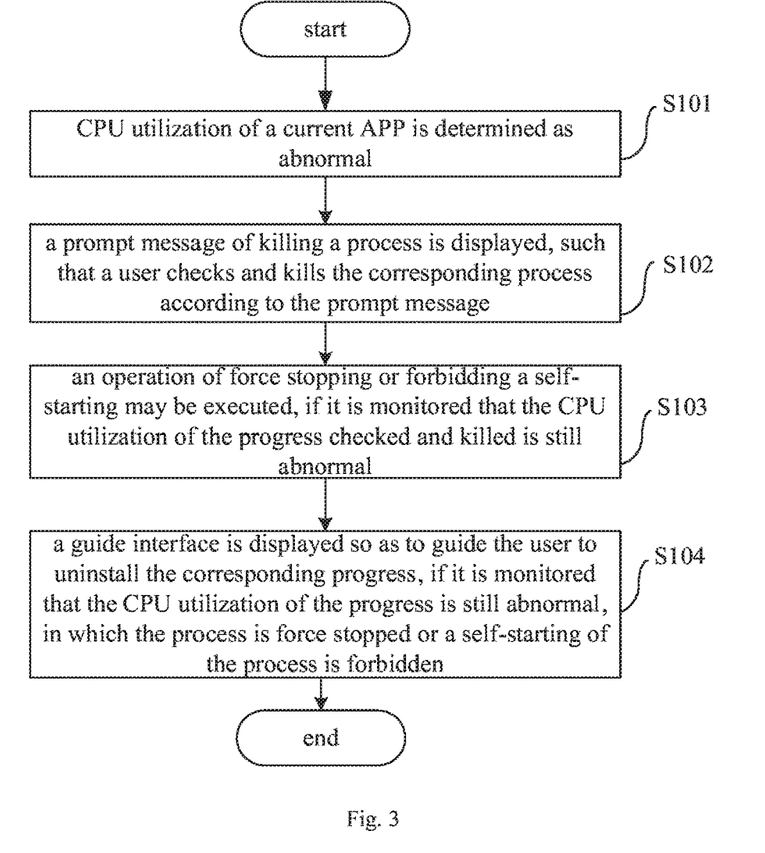
FIG. 3 is a flow chart of a method for processing abnormal CPU utilization of an application according to yet another embodiment of the present disclosure.

In order to further reduce the influence of the APP with abnormal CPU utilization on the running efficiency of mobile terminal, as shown in FIG. 3, the embodiment may also include followings.

In act S104, a guide interface is displayed so as to guide the user to uninstall the corresponding progress, if it is monitored that the CPU utilization of the progress is still abnormal, in which the process is force stopped or a self-starting of the process is forbidden.

In this embodiment, in the process of guiding a user to uninstall the corresponding progress, a list of APPs similar to the current APP is displayed to the user. That is, other APPs similar to the current APP may be pushed to the user in the process of uninstalling the current APP. For example, the APP is QQ Music, in the process of uninstalling QQ Music, other APPs of music in the recommendation list may be recommended to the user. For example, XiaMi Music, NetEase Music and KuGou Music may be displayed in the recommendation list. In addition, an update version of QQ Music may be displayed in the recommendation list.

In this embodiment, before the current APP is uninstalled, user data stored in the current APP is obtained and the corresponding user data is stored. For example, the APP is QQ Music, data related to the songs that the user collects or likes may be stored.

Figure 4:
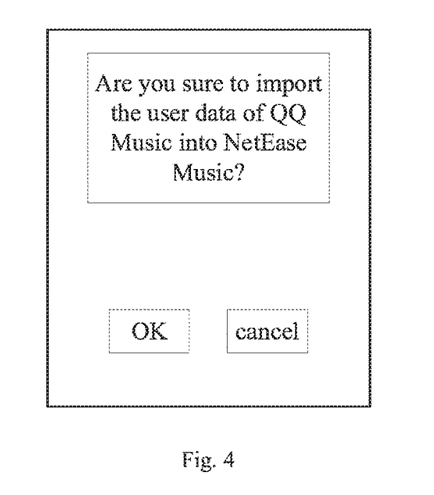
FIG. 4 is a schematic diagram of a prompt box for asking a user whether to import user data or not according to an embodiment of the present disclosure.

If a user selects a similar APP from the list, the mobile terminal may receive the user's selection, download the corresponding similar APP from the server according to the user's selection, install the similar APP, and display a prompt box to ask the user whether it is required to import the user data after the similar APP is installed. If the user needs to import the user data, the user data may be imported into the installed similar APP. For example, in the process of uninstalling QQ Music, the user selects NetEase Music in the recommendation list, and then the mobile terminal may display a prompt box as shown in FIG. 4 after NetEase Music is installed. The mobile terminal may import the user data generated during the usage of QQ Music by the user into NetEase Music after the user clicks the OK button. For example, data related to the songs that the user collects or likes may be imported into NetEase Music. Thus, after the APP is changed, the user can use the previous user data without adding manually, which saves a lot of operations for the user and is more humanized and intellectualized and convenient for the user to use the previous service continuously.

In conclusion, the embodiments of the present disclosure take different actions and provide various ways to deal with the abnormal CPU utilization of an APP background according to times and scenarios in which the abnormal CPU utilization of the APP background occurs, so as to provide a more humanized process mode and various processing schemes to deal with the abnormal CPU utilization.

In the embodiment of the method for processing abnormal CPU utilization of an application, a prompt message of killing a process is displayed after the CPU utilization of the APP is determined as abnormal, such that the user may check and kill the corresponding process according to the prompt message. Thus, the influence of the APP with abnormal CPU utilization on the running efficiency of mobile terminals may be reduced and the running efficiency of mobile terminals may be improved.

In order to implement the above embodiments, embodiments of the present disclosure provide a device for processing abnormal CPU utilization of an application.

Figure 5:
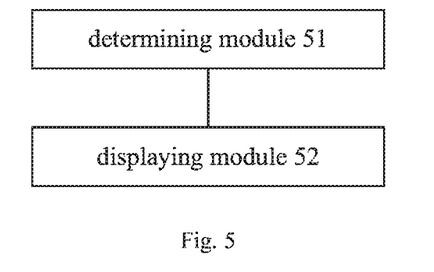
FIG. 5 is a block diagram of a device for processing abnormal CPU utilization of an application according to an embodiment of the present disclosure.

FIG. 5 is a block diagram of a device for processing abnormal CPU utilization of an application according to an embodiment of the present disclosure. As shown in FIG. 5, the device includes: a determining module 51 and a displaying module 52.

The determining module 51 is configured to determine that CPU utilization of the application is abnormal; the displaying module 52 is configured to display a prompt message of killing a process, such that a user checks and kills the process according to the prompt message.

The determining module 51 is specifically configured to: compute the CPU utilization of the application, judge whether the CPU utilization of the application is within a preset value range; if not, determine the CPU utilization of the application is abnormal.

Moreover, the device may also include an obtaining module 50. Before the determining module 51 judges whether the CPU utilization of the application is within the preset value range, the obtaining module 50 is configured to obtain parameter information of the application and send the parameter information to a server, and receive the preset value range returned from the server after the server inquires a local database according to the parameter information.

The preset value range of the CPU utilization of the APP refers to the value range of the CPU utilization of the APP pre-stored in the local database according to the parameter information of the APP. The parameter information includes but is not limited to identification information, running environment and a running scenario of the APP, in which the identification information is configured to uniquely identify an APP and may be a package name or packet signature information of the APP; the running environment refers to hardware environment and software environment of the terminal on which the current APP is installed; the running scenario refers to functions and operations that the APP may complete under a certain running environment (related to hardware environment and software environment), for example, downloading, uploading, running in the foreground or in the background etc. The more the functions or operations that the APP may complete, the higher the CPU utilization of the APP. For example, compared to the running environment of a 2D game, the running environment of a 3D game has a higher CPU utilization, which means that the 3D game consumes more CPU resources.

After the user checks and kills the corresponding process according to the prompt message, the process may not be killed thoroughly. In order to reduce the influence of the process which has not been killed thoroughly on the running efficiency of the mobile terminal, the device shown in FIG. 6 may also include a first processing module 53. After the displaying module 51 displays the prompt message of killing a process, the first processing module 53 is configured to execute an operation of force stopping or forbidding a self-starting if the CPU utilization of the progress checked and killed is still abnormal.

Figure 6:
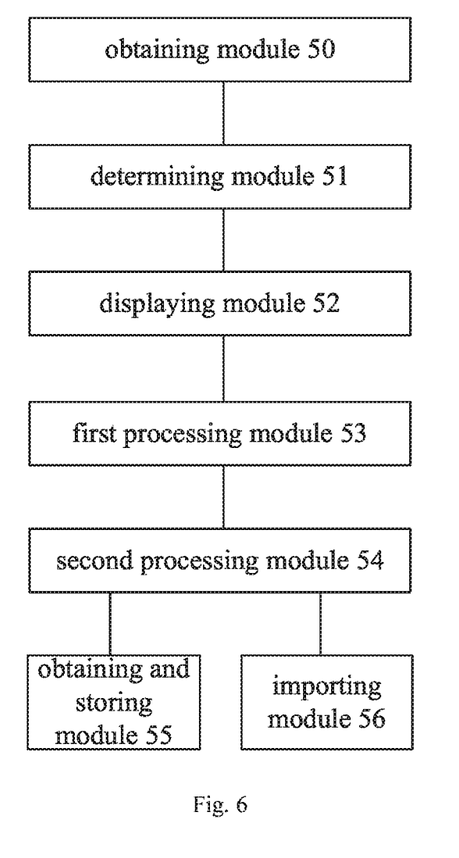
FIG. 6 is a block diagram of a device for processing abnormal CPU utilization of an application according to another embodiment of the present disclosure.

If the processing module 53 monitors that the CPU utilization corresponding to the APP is abnormal, the prompt page including information of force stopping or forbidding a self-starting may be displayed for a user. The mobile terminal may execute the operation of force stopping or forbidding a self-starting on the current APP according to the user's selection. Additionally, the operation of force stopping or forbidding a self-starting may be executed automatically according to the specific scenario.

At present, after the operation of force stopping is executed on a certain APP by the user, the APP may still start automatically. In order to further reduce the influence of the APP with abnormal CPU utilization on the running efficiency of the mobile terminal, the device may also include a second processing module 54. After the first processing module 53 executes the operation of force stopping or forbidding a self-starting, the second processing module 54 is configured to display a guide interface so as to guide the user to uninstall the progress if the CPU utilization of the progress is still abnormal, in which the process is force stopped or a self-starting of the process may be forbidden.

The displaying module 52 is also configured to display a list of applications similar to the application, so as to recommend a similar APP to the user.

In addition, the device also includes an obtaining and storing module 55. The obtaining and storing module 55 is configured to obtain user data stored in the APP and store the user data.

In order to provide convenience for a user to use the previous service after the APP is changed, the device may also include an importing module 56. After the obtaining and storing module 55 stores the user data, the importing module 56 is configured to receive and install the similar application selected by the user from the list and to import the user data into the similar application installed.

Since the importing module 56 imports the user data into the similar APP newly installed by the user, the user may use the previous user data continuously without adding manually, which saves a lot of operations for the user, and is more humanized and intellectualized and convenient for the user to use the previous service continuously.

In addition, after the importing module 56 receives and installs the similar APP selected by the user from the list and before the importing module 56 imports the user data into the similar APP installed, the displaying module 52 is further configured to display a prompt box to ask the user whether to import the user data or not.

Concerning processing process of the device for processing abnormal CPU utilization of an application, reference may be made to FIG. 1, FIG. 2 or FIG. 3, in which the device including an obtaining module 50, a determining module 51, a displaying module 52, a first processing module 53, a second processing module 54, an obtaining and storing module 55 and an importing module 56, which is not described herein.

The embodiments of the device for processing abnormal CPU utilization of an application determines through a determining module the CPU utilization of an APP is abnormal and displays through the displaying module the prompt message of killing a process such that a user may check and kill the corresponding process according to the prompt message. In this way, the influence of the APP with abnormal CPU utilization on the running efficiency of a mobile terminal may be reduced and the running efficiency of the mobile terminal may be improved.

In order to implement the above embodiments, an embodiment of the present disclosure provides a mobile terminal. The mobile terminal includes: a shell, a processor, a memory, a circuit board and a power supply circuit, in which the circuit board is located in a space formed by the shell, the processor and the memory are arranged on the circuit board; the power supply circuit is configured to supply power for each circuit or component in the mobile terminal; the memory is configured to store executable program codes; the processor is configured to execute a program corresponding to the executable program codes by reading the executable program codes stored in the memory so as to execute the followings.

In act S101', CPU utilization of a current APP is determined as abnormal.

Specifically, the CPU utilization of the current APP is computed and then it is judged whether the CPU utilization of the current APP is within a preset value range or not; if not, the CPU utilization of the current APP is determined as abnormal.

In this embodiment, before judging whether the CPU utilization of the current APP is within the preset value range, the process may also configured to: obtain parameter information of the APP and send the parameter information to a server, and receive the preset value range returned from the server after the server inquires a local database according to the parameter information.

Specifically, the mobile terminal receives the preset value range of the CPU utilization of the current APP returned from the server and judges whether the computed CPU utilization of the current APP is within the preset value range or not, and determines the CPU utilization of the current APP as abnormal if the CPU utilization of the current APP is not within the preset value range.

The preset value range of the CPU utilization of the APP refers to the value range of the CPU utilization of the APP pre-stored in the local database according to parameter information of the APP. The parameter information includes but is not limited to identification information, running environment and a running scenario of the APP, in which the identification information is configured to uniquely identify an APP and may be a package name or packet signature information of the APP; the running environment refers to hardware environment and software environment of the terminal on which the current APP is installed; the running scenario refers to functions and operations that the APP may complete under a certain running environment (related to the hardware environment and the software environment), for example, downloading, uploading, running in the foreground or in the background etc. The more the functions or operations that an APP may complete, the higher the CPU utilization of the APP. For example, compared to the running environment of a 2D game, the running environment of a 3D game has a higher CPU utilization, which means that the 3D game needs to consume more CPU resources.

For example, the APP is a game, the CPU utilization of the game computed by the mobile terminal according to the game's parameter information is 30%, but the value range of the CPU utilization of the game returned from the server is 20%-25%. Thus, the mobile terminal may determine that the CPU utilization of the game is not within the value range of the CPU utilization, and the CPU utilization of the game is abnormal.

In act S102', the prompt message of killing a process is displayed, such that a user checks and kills the corresponding process according to the prompt message.

Specifically, a prompt message of killing a process is displayed after determining the CPU utilization of the current APP running in the mobile terminal is abnormal. A user may kill the APP with abnormal CPU utilization, i.e., shut down the process of the APP, according to the prompt message. Thus, the influence of the APP with abnormal CPU utilization on the running efficiency of a mobile terminal may be reduced and the running stability of the mobile terminal may be improved.

After a user checks and kills the corresponding process according to the prompt message, the process may not be killed thoroughly. In order to reduce the influence of the process which has not been killed thoroughly on the running efficiency of the mobile terminal, the processor is also configured to execute act S103'.

In act S103', an operation of force stopping or forbidding a self-starting may be inhibited if it is monitored that the CPU utilization of the progress checked and killed is still abnormal.

Specifically, after a user shuts down the process of the APP with abnormal CPU utilization according to the prompt message, if the APP is configured with a background self-starting function, the APP may automatically start after a preset time interval such as 1 minute, and run in the background process of the mobile terminal continuously. For example, for smart phones configured with Android system, an APP can use the system broadcast of Android system to trigger the program of the APP to check the running status of the corresponding APP service. If the running status of the corresponding APP service has been shut down, i.e., the corresponding APP has been killed, the running status of the corresponding APP service may be changed and the APP may be restarted in background, i.e., the APP may run in background process of the mobile terminal again.

If it is monitored that the CPU utilization corresponding to the APP is abnormal, the prompt page including information of force stopping or forbidding a self-starting may be displayed for a user. The mobile terminal may execute an operation of force stopping or forbidding a self-starting on the current APP according to the user's selection. Additionally, the operation of force stopping or forbidding self-starting may be executed automatically according to the specific scenario.

At present, after the operation of force stopping is executed on a certain APP by a user, the APP may still start automatically.

In order to further reduce the influence of the APP with abnormal CPU utilization on the running efficiency of the mobile terminal, the processor is also configured to execute act S104'.

In act S104', a guide interface is displayed so as to guide the user to uninstall the corresponding progress, if it is monitored that the CPU utilization of the progress is still abnormal, in which the process is force stopped or a self-starting of the process is forbidden.

In this embodiment, in the process of guiding a user to uninstall the corresponding progress, a list of APPs similar to the current APP is displayed for the user. That is, other APPs similar to the current APP can be pushed to the user in the process of uninstalling the current APP. For example, the APP is QQ Music, in the process of uninstalling QQ Music, other APPs of music in the recommendation list may be recommended to the user. For example, XiaMi Music, NetEase Music and KuGou Music may be displayed in the recommendation list. In addition, an update version of QQ Music may be displayed in the recommendation list.

In this embodiment, before the current APP is uninstalled, user data stored in the current APP is obtained and the corresponding user data is stored. For example, the APP is QQ Music, data related to the songs that the user collects or likes may be stored.

If a user selects a similar APP from the list, the mobile terminal may receive the user's selection and download the corresponding similar APP from server according to the user's selection, install the similar APP, and display a prompt box to ask the user whether it is required to import the user data after the similar APP is installed. If the user needs to import the user data, the user data may be imported into the installed similar APP. For example, in the process of uninstalling QQ Music, the user selects NetEase Music in the recommendation list, and then the mobile terminal may display a prompt box as shown in FIG. 4 after NetEase Music is installed. The mobile terminal may import the user data generated during the usage of QQ Music by the user into NetEase Music after the user clicks the OK button. For example, data related to the songs that the user collects or likes may be imported into NetEase Music. Thus, after the APP is changed, the user can use the previous user data without adding manually, which saves a lot of operations for the user and is more humanized and intellectualized and convenient for the user to use the previous service continuously.

In conclusion, the embodiments of the present disclosure take different operations and provide various ways to deal with the abnormal CPU utilization of an APP background according to times and scenarios of the abnormal CPU utilization of the APP background occurring, so as to provide more humanized process modes and various processing schemes to deal with the abnormal CPU utilization.

With the mobile terminal according to an embodiment, the prompt message of killing a process is displayed after the CPU utilization of the current APP is determined as abnormal, such that the user may check and kill the corresponding process according to the prompt message. Thus, the influence of the APP with abnormal CPU utilization on the running efficiency of mobile terminals may be reduced and the running efficiency of mobile terminals may be improved.

Reference throughout this specification to "an embodiment", "some embodiments," "an embodiment", "a specific example," or "some examples," means that a particular feature, structure, material, or characteristic described in connection with the embodiment or example is included in at least an embodiment or example of the present disclosure. Thus, the appearances of the phrases in various places throughout this specification are not necessarily referring to the same embodiment or example of the present disclosure. Furthermore, the particular features, structures, materials, or characteristics may be combined in any suitable manner in one or more embodiments or examples. In addition, in a case without contradictions, different embodiments or examples or features of different embodiments or examples may be combined by those skilled in the art.

In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present invention, "a plurality of" means two or more than two, unless specified otherwise.

It will be understood that, the flow chart or any process or method described herein in other manners may represent a module, segment, or portion of code that comprises one or more executable instructions to implement the specified logic function(s) or that comprises one or more executable instructions of the acts of the progress. And the scope of a preferred embodiment of the present disclosure includes other implementations in which the order of execution may differ from that which is depicted or discussed in the flow chart, including in a basic same time manner or in reverse order according to the related functions, which should be understood by those skilled in the art.

The logic and act described in the flow chart or in other manners, for example, a scheduling list of an executable instruction to implement the specified logic function(s), it can be embodied in any computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the printer registrar for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, or compact discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be understood that each part of the present disclosure may be realized by the hardware, software, firmware or their combination. In the above embodiments, a plurality of acts or methods may be realized by the software or firmware stored in the memory and executed by the appropriate instruction execution system. For example, if it is realized by the hardware, likewise in another embodiment, the acts or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

It can be understood that all or part of the acts in the method of the above embodiments can be implemented by instructing related hardware via programs, the program may be stored in a computer readable storage medium, and the program includes one act or combinations of the acts of the method when the program is executed.

In addition, each functional unit in the present disclosure may be integrated in one progressing module, or each functional unit exists as an independent unit, or two or more functional units may be integrated in one module. The integrated module can be embodied in hardware, or software. If the integrated module is embodied in software and sold or used as an independent product, it can be stored in the computer readable storage medium.

The computer readable storage medium may be read-only memories, magnetic disks, or optical disks. Although explanatory embodiments are shown and described, it would be appreciated that the above embodiments are explanatory and cannot be construed to limit the present disclosure, and changes, alternatives, and modifications can be made in the embodiments without departing from scope of the present disclosure by those skilled in the art.

What is claimed is:

1. In a mobile terminal having a CPU and an application running on the CPU, a method for processing abnormal CPU utilization of the application, comprising:
   determining that CPU utilization of the application is abnormal comprising computing the CPU utilization of the application, determining whether the CPU utilization of the application is within a preset value range, and determining that the CPU utilization of the application is abnormal when the CPU utilization is not within the preset value range;
   displaying a prompt message on the mobile terminal of killing a process corresponding to the application when the CPU utilization of the application is determined to be abnormal; and
   determining, after displaying the prompt message, that CPU utilization of the application remains abnormal; and
   executing an operation forcing a stop to the process and preventing self-starting of the application.

2. The method according to claim 1, after executing an operation forcing a stop to the process and preventing self-starting of the application, further comprising:
   displaying a guide interface on the mobile terminal for uninstalling the application.

3. The method according to claim 2, further comprising:
   displaying a list of candidate applications similar to the application on the mobile terminal;
   receiving a selection of one of the candidate applications by a user;
   receiving and installing the selected candidate application on the mobile terminal.

4. The method according to claim 3, further comprising:
   obtaining user data stored in the application and storing the user data on the mobile terminal.

5. The method according to claim 4, after storing the user data, wherein:
   receiving and installing the selected candidate application includes importing the user data into the installed candidate application.

6. The method according to claim 5, after receiving and installing the selected candidate application, and before importing the user data into the installed candidate application, further comprising:
   displaying a prompt box on the mobile terminal asking whether to import the user data or not.

7. The method according to claim 1, before determining whether the CPU utilization of the application is within the preset value range, further comprising:
   obtaining parameter information of the application, sending the parameter information to a server, and receiving the preset value range from the server after the server inquires a local database according to the parameter information.

8. The method according to claim 7, wherein the parameter information comprises identification information, a running environment and a running scenario of the application.

9. A mobile terminal device for processing abnormal CPU utilization of an application on the mobile terminal, comprising:
   a processor, and
   a memory, storing instructions executable by the processor;
   wherein the processor, in response to execution of the instructions, performs a method comprising:
   determining that CPU utilization of the application is abnormal comprising computing the CPU utilization of the application, determining whether the CPU utilization of the application is within a preset value range, and determining that the CPU utilization of the application is abnormal when the CPU utilization is not within the preset value range;
   displaying a prompt message on the mobile terminal device of killing a process corresponding to the application when the CPU utilization of the application is determined to be abnormal; and
   determining, after displaying the prompt message, that CPU utilization of the application remains abnormal; and
   executing an operation forcing a stop to the process and preventing self-starting of the application.

10. The device according to claim 9, wherein, before determining whether the CPU utilization of the application is within the preset value range, the method includes:
    obtaining parameter information of the application, sending the parameter information to a server, and receiving the preset value range from the server after the server inquires a local database according to the parameter information.

11. The device according to claim 9, wherein, after executing an operation forcing a stop to the process and preventing self-starting of the application, the method further comprising:
    displaying a guide interface on the mobile terminal device for uninstalling the application.

12. The device according to claim 11, wherein the method includes;
- displaying a list of candidate applications similar to the application on the mobile terminal device;
- receiving a selection of one of the candidate applications by a user;
- receiving and installing the selected candidate application on the mobile terminal device.

13. The device according to claim 12, wherein the method includes:
- obtaining user data stored in the application and storing the user data on the mobile terminal device.

14. The device according to claim 13, wherein:
- receiving and installing the selected candidate application includes importing the user data into the installed candidate application.

15. The device according to claim 14, wherein the method includes:
- displaying a prompt box on the mobile terminal asking whether to import the user data or not, after receiving and installing the selected candidate application and before importing the user data into the installed candidate application.

16. A mobile terminal comprising:
- a shell, a processor, a memory, a circuit board and a power supply circuit, in which the circuit board is located in a space formed by the shell, the processor and the memory are arranged on the circuit board; the power supply circuit is configured to supply power for each circuit or component in the mobile terminal; the memory is configured to store executable program codes; the processor is configured to perform a method in response execution of the executable program codes comprising:
- determining that CPU utilization of the application is abnormal comprising computing the CPU utilization of the application, determining whether the CPU utilization of the application is within a preset value range, and determining that the CPU utilization of the application is abnormal when the CPU utilization is not within the preset value range;
- displaying a prompt message on the mobile terminal of killing a process corresponding to the application when the CPU utilization of the application is determined to be abnormal; and
- determining, after displaying the prompt message, that CPU utilization of the application remains abnormal; and
- executing an operation forcing a stop to the process and preventing self-starting of the application.

\* \* \* \* \*